United States Patent
Rakshit et al.

(10) Patent No.: US 11,645,871 B1
(45) Date of Patent: May 9, 2023

(54) ENGAGEMENT BASED CONTEXTUAL FEEDBACK FOR DEVICES

(71) Applicant: INTERNATIONAL BUSINESS MACHINES CORPORATION, Armonk, NY (US)

(72) Inventors: Sarbajit K. Rakshit, Kolkata (IN); Venkata Vara Prasad Karri, Visakhapatnam (IN); Sri Harsha Varada, Vizianagaram (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/455,420

(22) Filed: Nov. 18, 2021

(51) Int. Cl.
| | |
|---|---|
| *G06F 3/16* | (2006.01) |
| *G06V 40/20* | (2022.01) |
| *G06F 3/01* | (2006.01) |
| *G06F 3/04895* | (2022.01) |
| *G06F 3/0485* | (2022.01) |

(52) U.S. Cl.
CPC ............. *G06V 40/20* (2022.01); *G06F 3/016* (2013.01); *G06F 3/0485* (2013.01); *G06F 3/04895* (2013.01); *G06F 2218/16* (2023.01)

(58) Field of Classification Search
None
See application file for complete search history.

(56) References Cited

U.S. PATENT DOCUMENTS

| | | | |
|---|---|---|---|
| 9,317,116 B2 | 4/2016 | Ullrich | |
| 9,733,880 B2 | 8/2017 | Levesque | |
| 10,067,737 B1* | 9/2018 | Ozery | H04R 3/005 |
| 2006/0190822 A1 | 8/2006 | Basson | |
| 2016/0063827 A1 | 3/2016 | Moussette | |

FOREIGN PATENT DOCUMENTS

CN 103631373 B 6/2019

OTHER PUBLICATIONS

Johnston, "Microfluids panel cold add physical buttons to a touch screen", https://arstechnica.com/gadgets/2014/01/new-microfluidics-panel-could- . . . , Jan. 23, 2014, pp. 1-4.
(Continued)

*Primary Examiner* — Carl Adams
(74) *Attorney, Agent, or Firm* — Tihon Poltavets

(57) ABSTRACT

A method for engagement based contextual feedback, the method determines a required level of attention for a user interacting with content in a user interface of an electronic device and determines a level of attention for the user interacting with the content in the user interface of the electronic device. In responsive to determining the required level of attention is greater than the level of attention for the user, the method identifies available corrective actions performable by one or more electronic components on the electronic device. In responsive to identifying one or more user and electronic device interactions, the method selects one or more corrective actions from the available actions based on the one or more user and electronic device interactions. The method performs, via the one or more electronic components, the selected one or more corrections actions on the electronic device.

20 Claims, 6 Drawing Sheets

(56) References Cited

OTHER PUBLICATIONS

Mell et al., "The NIST Definition of Cloud Computing", National Institute of Standards and Technology, Special Publication 800-145, Sep. 2011, pp. 1-7.
Plafke, "Haptic Holographic Display Turns Thin Air Into a Touch-screen", https://www.extremetech.com/extreme/193032-haptic-holographic-displa . . . , Oct. 28, 2014, pp. 1-8.
Steil et al., "Forecasting User Attention During Everyday Mobile Interactions Using Device-Integrated and Wearable Sensors", https://arxiv.org/abs/1801.06011, Jul. 25, 2018, pp. 1-13.
Winkler et al., "Investigating Mid-Air Pointing Interaction for Projector Phones", https://www.researchgate.net/publication/259990907_Investigating_mid-air_pointing_interaction_for_projector_phones, Nov. 2012, pp. 1-11.

* cited by examiner

ENGAGEMENT BASED CONTEXTUAL FEEDBACK FOR DEVICES

BACKGROUND

This disclosure relates generally to electronic devices, and in particular to providing contextual feedback based on user engagement operating an electronic device.

Electronic devices, such as tablet computers, are used in various professional and educational settings where a user can interact with a tablet computer for extended periods of time. In a professional setting, a user can perform a maintenance checklist on server equipment at a client site utilizing the tablet, where the maintenance checklist can include repetitive questions to ensure proper inspections are performed on each piece of equipment. In an education setting, a user can perform an exam on the tablet computer, where the exam includes numerous multiple-choice questions arranged in a repetitive manner. An inherent operation of having to scroll through a user interface to view different portions of a maintenance checklist or an exam in a user interface of the tablet computer can affect a level of engagement of a user operating on the tablet computer due to the repetitive task of having to scroll and view the different portions.

SUMMARY

Embodiments in accordance with the present invention disclose a method, computer program product and computer system for engagement based contextual feedback, the method, computer program product and computer system can determine a required level of attention for a user interacting with content in a user interface of an electronic device. The method, computer program product and computer system can determine a level of attention for the user interacting with the content in the user interface of the electronic device. The method, computer program product and computer system can, responsive to determining the required level of attention is greater than the level of attention for the user, identify available corrective actions performable by one or more electronic components on the electronic device. The method, computer program product and computer system can, responsive to identifying one or more user and electronic device interactions, select one or more corrective actions from the available actions based on the one or more user and electronic device interactions. The method, computer program product and computer system can perform, via the one or more electronic components, the selected one or more corrections actions on the electronic device.

DETAILED DESCRIPTION

Embodiments of the present invention provide user engagement based contextual feedback for mobile devices. As a user engages with a user interface on a mobile device, embodiments of the present invention determine a level of attention of the user and provide contextual feedback in the form of one or more corrective actions on the mobile device to increase the level of attention of the user. Performing the one or more corrective actions includes selecting an appropriate level of sensation on the mobile device for one or more of: a duration of a haptic feedback, a haptic feedback propagation path and speed, a pattern for haptic feedback, a microfluid based deformation pattern on a display of the mobile device, and a holographic object projection. Based on object recognition of images in the user interface on the mobile device, embodiments of the present invention monitor different types of finger interactions of the user with regards to the recognized objects and enhance user interactions with the recognized objects utilizing holographic object projections. As the user interacts with the objects (i.e., content) in the user interface of the mobile device, embodiments of the present invention determine whether one or more haptic based corrective actions can increase a level of attention of the user to a required level of attention and a knowledge corpus is created to identify an appropriate level of sensation for the one or more haptic based corrective actions.

Embodiments of the present invention monitor user biometric data utilizing one or more sensors on the mobile device and/or one or more sensors on a wear device associated with the user and determine the level of attention of the user, based on the biometric data, gestures being performed when the biometric data was captured, and an interaction level with the content. The interaction level is contextually associated with the content being engaged with by the user and includes a number of distractions (e.g., performing a secondary task, eye movement away from the user interface), a number of mistakes, and an importance of the primary task being performed on the content with which the user is engaged with. Embodiments of the present invention determine an appropriate level of sensation for the one or more corrective actions based on a deviation of the level of attention of the user versus a required level of attention for the content being engaged with by the user in the user interface on the mobile device. Subsequently, each of the one or more corrective actions are performed at the appropriate level of sensation to increase the level of attention for the user to meet or exceed the required level of attention of the user for the primary task being performed on the content with which the user is engaged with.

Figure 1:
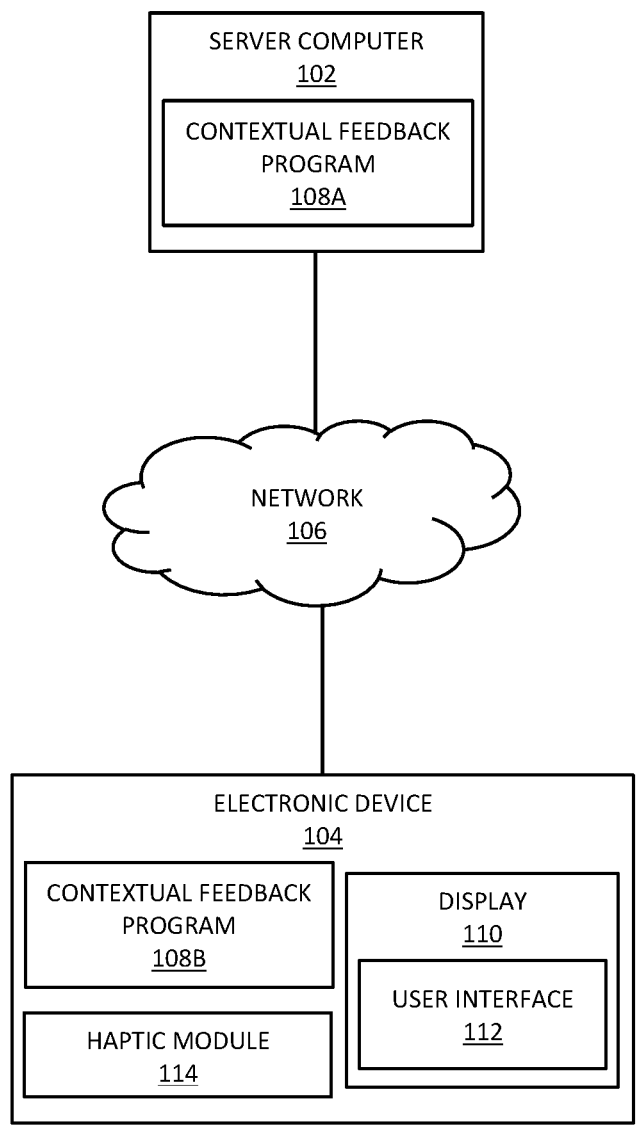
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102 and electronic device 104 all interconnected over network 106. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a smart phone, or any programmable electronic device capable of communicating with electronic device 104 and other computing devices (not shown) within the distributed data processing environment via network 106. In another embodiment, server computer 102 represents a computing system utilizing clustered computers and components (e.g., database server computers, application server computers, etc.) that act as a single pool of seamless resources when accessed within the distributed data processing environment. Server computer 102 includes server-side contextual feedback program 108A. Server computer 102 may include internal and external hardware components, as depicted and described in further detail with respect to FIG. 4.

Electronic device 104 can be a laptop computer, a tablet computer, a smart phone, smart watch, or any programmable electronic device with a display with user interface capable of communicating with various components and devices within the distributed data processing environment (e.g., server computer 102), via network 106. Electronic device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, electronic device 104 represents one or more programmable electronic devices or combination of programmable electronic devices capable of executing machine readable program instructions and communicating with other computing devices (not shown) within the distributed data processing environment via a network, such as network 106. In one embodiment, electronic device 104 represents one or more devices associated with a user. Electronic device 104 includes an client-based contextual feedback program 108B, display 110, user interface 112, and haptic module 114. Electronic device 104 can also include various sensors for capturing movements and biometric data for the user engaging with user interface 112, where the various sensors can include but are not limited to: an accelerometer, a gyroscope sensor, an orientation sensor (e.g., position sensor, location sensor), and a biosensor. Electronic device 104 can also include a holographic projector for display a two-dimensional or three-dimensional image as a corrective action that is in a line of sight of the user engaging with user interface 112.

Display 110 allows the user of electronic device 104 to engage with user interface 112, where display 110 is a touch screen display. Display 110 can include a microfluidics layer to provide a corrective action, such as a ripple effect, in the user interface, where the corrective action is physically experienced by the user of electronic device 104. User interface 112 enables a user to make requests of or issue commands to electronic device 104 and server computer 102 via network 106. User interface 112 also enables the user to receive information and instructions in response on electronic device 104 via network 106. In one embodiment, a user of electronic device 104 accesses user interface 112 via voice commands in natural language. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 112 enables a user of electronic device 104 to interact with each instance of contextual feedback program 108A and 108B operating on server computer 102 and electronic device 104, respectively. Haptic module 114 represents one or more vibration motor and associated circuitry for providing one or more corrective actions that are physically experienced by the user of electronic device 104.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks capable of receiving and transmitting data, voice, and/or video signals, including multimedia signals that include voice, data, and video information. In general, network 106 can be any combination of connections and protocols that will support communications between server computer 102, electronic device 104, and other computing devices (not shown) within the distributed data processing environment.

Contextual feedback program 108 determines a required level of attention for a user interacting with electronic device 104, where the user is interacting with one or more objects of content in user interface 112. The required level of attention for the user is based on the content (e.g., exam, maintenance checklist) with which the user is engaged with. Contextual feedback program 108 determines a level of attention for the user interacting with electronic device 104 based on biometric data, gestures being performed when the biometric data was captures, and an interaction level with the content in user interface 112. The interaction level is contextually associated with the content being engaged with by the user. Contextual feedback program 108 determines whether the required level of attention is greater than the determined level of attention for the user. If contextual feedback program 108 determines the required level of attention is equal to or less than the determined level of attention for the user, contextual feedback program 108 reverts to determining the level of attention for the user interactive with electronic device 104. If contextual feedback program 108 determines the required level of attention is greater than the determined level of attention for the user, contextual feedback program 108 identifies available corrective actions.

The available corrective actions are dependent on electronic device 104 and one or more modules available for performing the available corrective actions. For example, contextual feedback program 108 identified available corrective actions based on operational features of haptic module 114 on electronic device 104. Subsequently, contextual feedback program 108 identifies current user and electronic device 104 interactions since a specific corrective action might not be applicable to a current situation where the determined level of attention of the user has fallen below the required level of attention. For example, if contextual feedback program 108 determines the user of electronic device 104 is not interacting with user interface 112, a specific corrective action utilizing a microfluidic layer might not be applicable since the user is not physically contacting display 110. Contextual feedback program 108 selects a corrective action from the available corrective action based on the current user and electronic device 104 interactions. The selection of the corrective action includes an appropriate level of sensation based on the current user and electronic device 104 interactions to ensure the user recognizes the corrective action directed at them and to ensure the level of attention of the user is restored to a level at or above the required level of attention. Contextual feedback program 108 performs the selected corrective action on electronic device 104 at the appropriate level of sensation.

Figure 2:
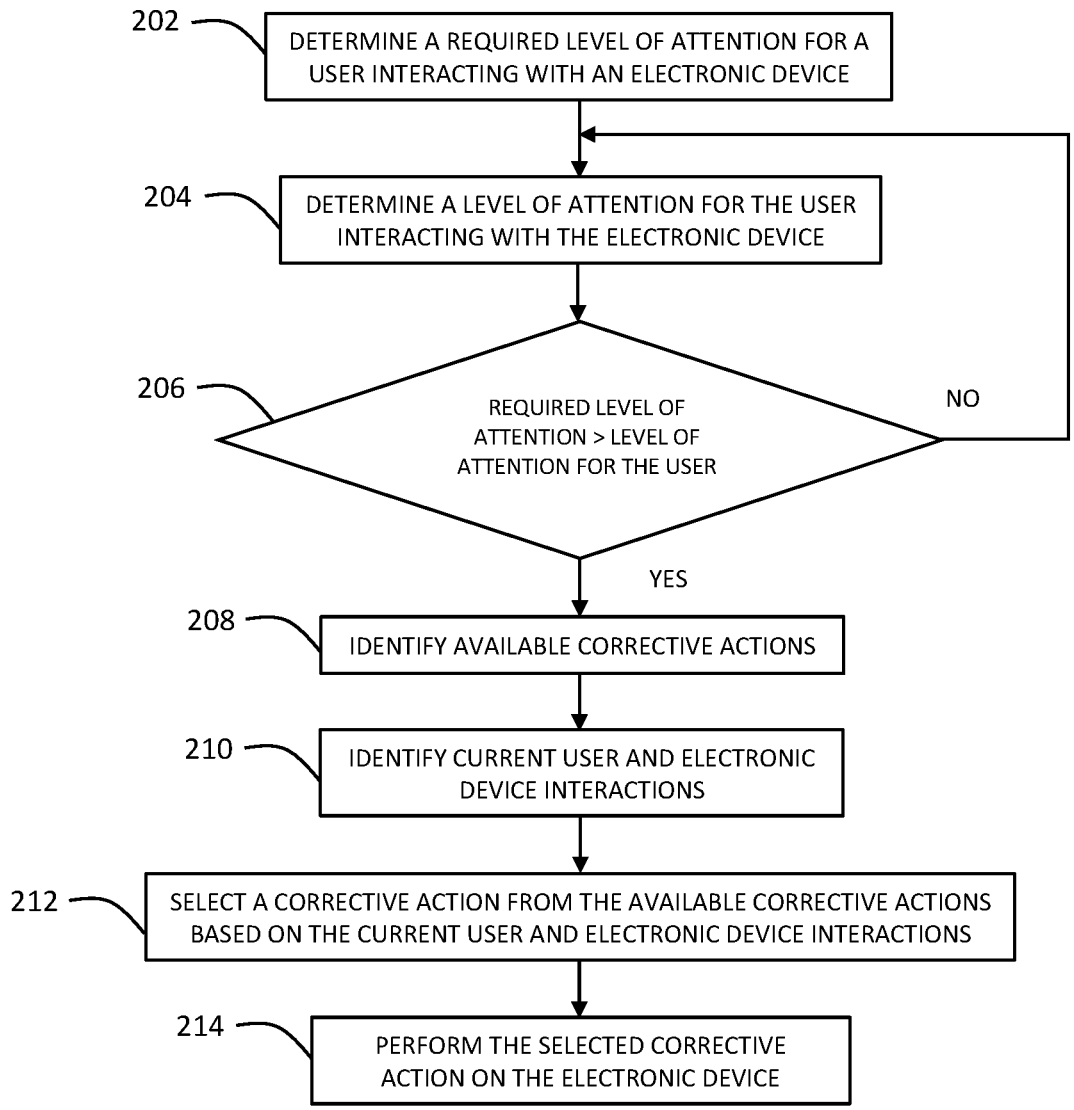
FIG. 2 depicts a flowchart for a contextual feedback program for providing a corrective action on an electronic device to alert a user, in accordance with an embodiment of the present invention.

FIG. 2 depicts a flowchart for a contextual feedback program for providing a corrective action on an electronic device to alert a user, in accordance with an embodiment of the present invention.

Contextual feedback program 108 determines a required level of attention for a user interacting with an electronic device (202). A required level of attention represents an expected engagement of the user for interacting with the electronic device to ensure one or more content defined tasks are performed. Contextual feedback program 108 determines the required level of attention for the user interacting with the electronic device based on a number of parameters associated with the content being interacted with. Contextual feedback program 108 utilizes a weighted scoring system to determine the required level of attention for the user interacting with the electronic device. In one embodiment, contextual feedback program 108 analyzes the content being displayed in the user interface utilizing natural language processing and determines whether the content is educational, professional, or leisurely. In another embodiment, contextual feedback program 108 receives an input from the user specifying the type of content being displayed in the user interface of the electronic device. For educational and professional content type, the expected engagement of the user for interacting with electronic device is greater than the expected engagement of the user for leisurely content type, resulting in a greater required level of attention for the user for educational and professional content type compared to leisurely content type. As a result, contextual feedback program 108 can assign a higher score to the educational and the professional content type and a lower score to the leisurely content type. Contextual feedback program 108 can assign a weight to a score assigned based on content type if contextual feedback program 108 determines a time constraint (e.g., one hour timer) is present for completing the one or more content defined tasks. For example, if contextual feedback program 108 determines a time constraint is present for the one or more content defined tasks, contextual feedback program 108 assigns a higher weight is given to the content type with one or more content defined tasks compared to the content type with one or more content defined tasks without a time constraint. The time constraint represents an urgency of the user to remain attentive and complete the one or more content defined tasks.

Contextual feedback program 108 can determine a number of content defined tasks with which the user is to interact, where a greater amount of content defined tasks requires a greater required level of attention for the user interacting with the content. As a result, contextual feedback program 108 can assign a higher score to the content with a greater amount of content defined tasks and a lower score to the content with a lower amount of content defined tasks. Contextual feedback program 108 can assign a weight to a score assigned based on an amount of content defined tasks if contextual feedback program 108 determines a time constraint (e.g., one hour timer) is present for completing the content defined task. Contextual feedback program 108 can determine a portion of time available for completing each of the content defined tasks, while ensuring the time constraint is maintained. Depending on the portion of time available for completing each of the content defined task, contextual feedback program 108 assigns a weight to the score. Contextual feedback program 108 assigns a higher weight to the score for a lesser portion of time available (e.g., 2 minutes) for completing each of the content defined tasks and assigns a lower weight to the score for a greater portion of time available (e.g., 24 hours) for completing each of the content defined tasks.

Contextual feedback program 108 can analyze each of the content defined tasks for the content and assign a score based on a level of importance of the content defined tasks. Contextual feedback program 108 can utilize natural language processing for each of the content defined task to identify a topic and a type of engagement from the user with regards to the content defined tasks, for assigning the score based on the level of importance of the content defined tasks. Contextual feedback program 108 determines a topic (e.g., educational exam, maintenance checklist) based on content being displayed in the user interface of the electronic device and any metadata associated with the content being displayed. Contextual feedback program 108 determines one or more types of engagement from the user based on how the user is to interact with the content in the user interface of the electronic device. The type of engagement can include but are not limited to selecting objects in a user interface via a touch screen display, providing text into one or more selected fields, reading content (e.g., text), viewing content (e.g., images, videos), and listening to content (e.g., audio). Contextual feedback program 108 assigns a higher score for types of engagement requiring physical interactions with the user interface (e.g., selecting objects, providing text) and a lower score for types of engagement requiring non-physical interactions (e.g., reading content, listening to content). Contextual feedback program 108 assigns a weight to the score for the type of engagement based on the determined topic, where a higher weight is assigned to a topic relating to educational and professional content and a lower weight is assigned to a topic relating to leisurely content.

In one example, a user is engaging with a user interface on an electronic device, where the user is performing an educational based exam in the user interface with a two-hour countdown for completing the exam. The educational based exam includes fifty multiple choice questions and three fields for entering text (e.g., essay portions). Contextual feedback program 108 determines a required level of attention for the user interacting with the electronic while performing the educational based exam. Contextual feedback program 108 determines various parameters that include a content type as educational, fifty of a first type of content defined task, three of a second type of content defined task, a time constraint of two hours, and a type of engagement that includes selecting objects in the user interface (i.e., multiple choice answer) and providing text into one or more selected fields (i.e., essay portions). Contextual feedback program 108 provides a score and/or weight for each of the determined parameters and combines the scores and weights to determine a final score for the required level of attention for the user interacting with the electronic device. If the weighted score range is zero to one hundred, zero being the least amount of required level of attention and hundred being the highest amount of required level of attention, contextual feedback program 108 determines a required level of attention for the user as being ninety-five. Had the time constraint been greater (e.g., an hour and thirty minutes), a required level of attention would have been greater and had the time constraint been less (e.g., two hours and thirty minutes, a required level of attention would have been less.

In another example, a user is engaging with a user interface on an electronic device, where the user is performing an inspection with a maintenance checklist for server equipment at a client site. The maintenance checklist includes multiple questions for each piece of server equipment, where each question has a field in the user interface for entering comments and observations of the user performing the inspection. Contextual feedback program 108 determines a required level of attention for the user interacting with the electronic while performing the maintenance. Contextual feedback program 108 determines various parameters that include a content type of professional, a portion of the multiple questions are repetitive between each piece of server equipment, no time constraint is present, and a type of engagement that includes selecting objects in the user interface (i.e., selecting a serial number) and providing text into one or more selected fields (i.e., comments and observations). Contextual feedback program 108 provides a score and/or weight for each of the determined parameters and combines the scores and weights to determine a final score for the required level of attention for the user interacting with the electronic device.

Contextual feedback program 108 determines a level of attention for the user interacting with the electronic device (204). Contextual feedback program 108 determines the level of attention for the user interacting with the electronic device based on a number of parameters associated with user. The parameters associated can include biometric data for the user, gestures being performed when the biometric data for the user was captured, and an interaction level for the user with respect to the content in the user interface. The biometric data can include but is not limited to heart rate, respiratory rate, oxygen level, and eye movements (e.g., blinking, line of sight). The gestures can include inputs on the user interface of the electronic device via a touch screen display. The interaction level is contextually associated with the content being engaged with by the user and can include but is not limited to a number of distractions (e.g., performing a secondary task, eye movement away from the user interface), a number of mistakes, and an importance of the primary task being performed on the content with which the user is engaged with. Contextual feedback program 108 assigns a score and weight for each parameter and determines a final score for the level of attention for the user interacting with the electronic device.

In one example, a user is performing an educational based exam in the user interface with a two-hour countdown for completing the exam. The educational based exam includes fifty multiple choice questions and three fields for entering text (e.g., essay portions). Contextual feedback program 108 determines a level of attention for the user interacting with the electronic device based on the parameters associated with the user. Contextual feedback program 108 receives biometric data for the user indicating slower eye movements and a line of sight that exceeds the bounds of the user interface of the electronic device. The line of sight exceeding the bounds of the user interface of the electronic device indicate that the user's eyes are wondering and not focused on the exam. Contextual feedback program 108 also determines gestures (e.g., answer selection for a multiple-choice question) being received by the electronic device are at interval which would exceed a time constrain (i.e., two hours) of the educational based exam, where the user will not finish the exam on time based on current interval levels. Contextual feedback program 108 also determines the user is performing a secondary task of listening to audio not associated with the primary task of performing the educational based exam, where the primary task is marked as having a high importance and a higher weight. Contextual feedback program 108 provides a score and a weight for each of the parameters associated with the user and determines a level of attention for the user interacting with the electronic device.

In another example, a user is performing an inspection with a maintenance checklist for server equipment at a client site. The maintenance checklist includes multiple questions for each piece of server equipment, where each question has a field in the user interface for entering comments and observations of the user performing the inspection. Contextual feedback program 108 determines a level of attention for the user interacting with the electronic device based on the parameters associated with the user. Contextual feedback program 108 receives biometric data for the user indicating alert eye movements and a line of sight that exceeds the bounds of the user interface of the electronic device. However, since the content type is professional based, contextual feedback program 108 assigns a lower weight to this portion of the biometric data because the line of sight exceeding the bounds of the user interface of the electronic device most likely indicates that the user is inspecting server equipment rather focusing on an irrelevant task. Contextual feedback program 108 also determines gestures (e.g., field selections for entering text) being received by the electronic device are at consistent intervals (e.g., every five minutes) with minor deviations (e.g., one minute). Contextual feedback program 108 also determines the user is performing a secondary task of engaging in communications with a chatbot while performing the maintenance checklist as a primary task. However, contextual feedback program 108 assigns a lower weight to the secondary task due to context surround the secondary task and a possibility of the secondary task being related to the primary task, where the chatbot is providing technical support to the user performing the maintenance checklist. Contextual feedback program 108 provides a score and a weight for each of the parameters associated with the user and determines a level of attention for the user interacting with the electronic device.

Contextual feedback program 108 determines whether the required level of attention is greater than the level of attention for the user (decision 206). Contextual feedback program 108 compares a weighted score for the required level of attention to the weighted score for the level of attention for the user and determines whether the weighted score for the required level of attention is greater than the weight score for the level of attention for the user. In the event contextual feedback program 108 determines the required level of attention is greater than the level of attention for the user ("yes" branch, decision 206), contextual feedback program 108 identifies available corrective actions (208). If the event contextual feedback program 108 determines the required level of attention is equal to or less than the level of attention for the user ("no" branch, decision 206), contextual feedback program 108 reverts to determining a level of attention for the user interacting with the electronic device (204).

Contextual feedback program 108 identifies available corrective actions (208). The available corrective actions are dependent on the electronic device and one or more electronic components on the electronic device available for performing the available corrective actions. For discussion purposes, the one or more electronic components includes one or more haptic modules, a microfluidic layered display, and a holographic projector. In one embodiment, contextual feedback program 108 determines the electronic device includes one or more haptic modules, where the one or more haptic modules are capable of providing haptic feedback in various patterns and locations on the electronic device to increase a level of attention for the user to meet or exceed the required level of attention. In another embodiment, contextual feedback program 108 determines the electronic device includes a microfluidic layer, where the microfluidic layer is capable of providing a physical effect (e.g., ripple effect) on the display with the user interface experienceable by the user to increase a level of attention for the user to meet or exceed the required level of attention. In yet another embodiment, contextual feedback program 108 determines the electronic device includes a holographic display and/or projector, where the holographic display and/or projector is capable of projecting two-dimensional or three-dimensional objects to increase a level of attention for the user to meet or exceed the required level of attention. It is to be noted, a combination of one or more of the above-mentioned embodiments are possible, where contextual feedback program 108 determines the electronic device includes one or more of: one or more haptic modules, a microfluidic layered display, and a holographic display and/or projector.

Contextual feedback program 108 identifies current user and electronic device interactions (210). User and electronic device interactions represent a level and a type of engagement of the user with respect to a user interface in a display on the electronic device. The level of engagement represents whether the user is engaging with the user interface (i.e., touching one or more objects in the user interface), whether a line of sight of the user is directed towards the user interface, whether the user is in a vicinity of the user interface, and whether the electronic device is being held by the user. The type of engagement of the user represents whether the user is engaging physically (i.e., touch) and/or passively (i.e., viewing content) with the user interface on the electronic device. In one example, a user is performing an educational based exam in the user interface with a two-hour countdown for completing the exam. The educational based exam includes fifty multiple choice questions and three fields for entering text (e.g., essay portions). Contextual feedback program 108 previously determined the required level of attention was below the level of attention for the user since the user was engaged in a secondary task while the primary task included a time constrain for completion. Contextual feedback program 108 identifies the current user and electronic device interaction includes the user engaging with a secondary task of listening to audio not associated with the primary task of performing the educational based exam and the user is engaging physically with the user interface on the electronic device (e.g., selecting a song title). In another example, a user is performing an inspection with a maintenance checklist for server equipment at a client site. The maintenance checklist includes multiple questions for each piece of server equipment, where each question has a field in the user interface for entering comments and observations of the user performing the inspection. Contextual feedback program 108 previously determined the required level of attention was below the level of attention for the user since the user overlooked one or more fields for entering comments and observations. Contextual feedback program 108 identifies the current user and electronic device interaction includes the user holding the electronic device and engaging physically with the user interface on the electronic device (e.g., selecting another field for entering comments and observations).

Contextual feedback program 108 selects a corrective action from the available corrective actions based on the current user and electronic device interactions (212). Contextual feedback program 108 utilizes the identified current user and electronic device interactions to select one or more corrective actions from the available corrective actions, along with an appropriate level of sensation for the one or more corrective actions. A corrective action can include but is not limited to a vibration from the haptic module, a deformation from a microfluidic layered display, and a projection from a holographic display and/or projector. Contextual feedback program 108 determines the appropriate level of sensation for the corrective actions based on a deviation of the level of attention of the user versus a required level of attention for the content being engaged with by the user in the user interface on the electronic device. The greater the deviation between the required level of attention and the level of attention of the user, the greater the appropriate level of sensation contextual feedback program 108 utilizes when performing the selected corrective action. Contextual feedback program 108 selects the appropriate level of sensation on the electronic device for one or more of: a duration of a haptic feedback, a haptic feedback propagation path and speed, a pattern for haptic feedback, a microfluid based deformation pattern on a display of the electronic device, and a holographic object projection.

The duration of a haptic feedback can be based on a time interval (e.g., ten seconds) and/or until the required level of attention is equal to or less than the level of attention of the user. The haptic feedback propagation path and speed represents how rapidly the haptic motor of the haptic module is to produce a vibration and for electronic device with two or more haptic modules, a path of the vibration across the electronic device as contextual feedback program 108 dictates a speed of vibration for the haptic motor of each of the two or more haptic modules. The pattern for the haptic feedback represents interval for which contextual feedback program 108 activates a haptic motor on each of the haptic modules on the electronic device (e.g., two second long vibrations followed by a single five second vibration). The microfluid based deformation pattern on the display of the electronic device represents a type of deformation pattern (e.g., ripple effect) surrounding an area in the user interface on the display of the electronic device. The holographic object projection represents an object projected from the electronic device viewable by the user, where the object can be, for example, a symbol, a line, or a color projection.

In one example, a user is performing an educational based exam in the user interface with a two-hour countdown for completing the exam. The educational based exam includes fifty multiple choice questions and three fields for entering text (e.g., essay portions). Contextual feedback program 108 previously determined the required level of attention was below the level of attention for the user since the user was engaged in a secondary task while the primary task included a time constrain for completion. Contextual feedback program 108 previously identified the current user and electronic device interaction includes the user engaging with a secondary task of listening to audio not associated with the primary task of performing the educational based exam and the user is engaging physically with the user interface on the electronic device (e.g., selecting a song title). Contextual feedback program 108 selects two corrective actions which includes producing a constant vibration for ten seconds and projecting a red color from the electronic device to capture the attention of the user. In another example, a user is performing an inspection with a maintenance checklist for server equipment at a client site. The maintenance checklist includes multiple questions for each piece of server equipment, where each question has a field in the user interface for entering comments and observations of the user performing the inspection. Contextual feedback program 108 previously determined the required level of attention was below the level of attention for the user since the user overlooked one or more fields for entering comments and observations. Contextual feedback program 108 previously identified the current user and electronic device interaction includes the user holding the electronic device and engaging physically with the user interface on the electronic device (e.g., selecting another field for entering comments and observations). Contextual feedback program 108 selects a first corrective action which includes producing a ripple effect with the microfluidic layer on the display around a field in the user interface with which the user is currently engaging with. Contextual feedback program 108 selects a second corrective action which includes projecting an arrow indicating a direction to scroll in the user interface to view the overlooked one or more fields for entering comments and observation.

Contextual feedback program 108 performs the selected corrective action on the electronic device (214). Contextual feedback program 108 instructs one or more of: the haptic modules, the microfluidic layered display, and the holographic display and/or projector, to perform each of the selected corrective actions at the appropriate levels on the electronic device. In one example, contextual feedback program 108 instructs multiple haptic modules on the electronic device to perform a haptic vibration for a duration of ten seconds with an alternating propagation path between the multiple haptic modules to capture the attention of the user. In another example, contextual feedback program 108 instructs the microfluidic layered display to produces a ripple pattern around an object in the user interface to capture the attention of the user. In yet another example, contextual feedback program 108 instructs a holographic projector to project an image in a determined line of sight of the user to capture the attention of the user.

Figure 3:
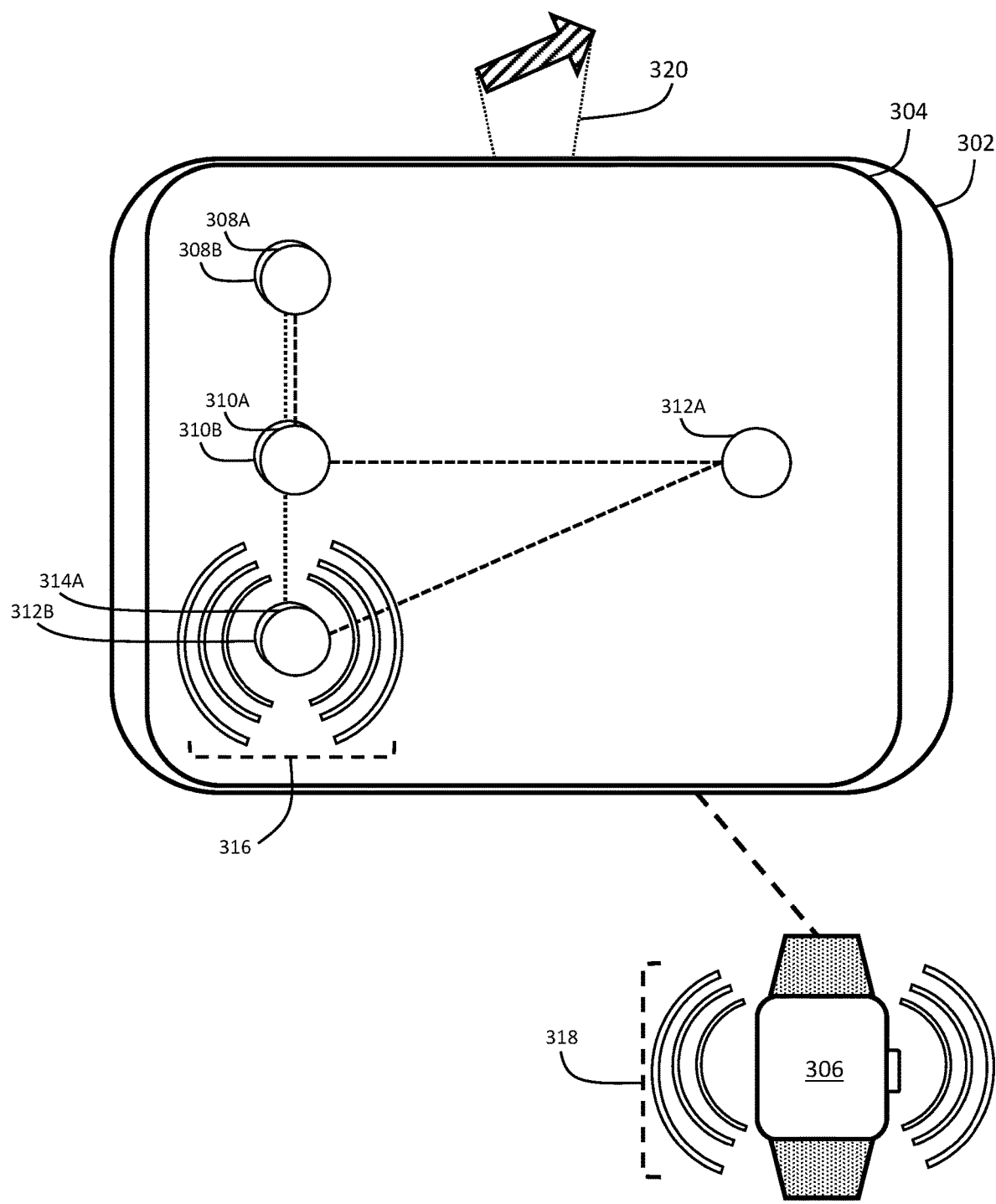
FIG. 3 illustrates an example of a contextual feedback program providing a corrective action on multiple electronic devices to alert a user, in accordance with an embodiment of the present invention.

FIG. 3 illustrates an example of a contextual feedback program providing a corrective action on multiple electronic devices to alert a user, in accordance with an embodiment of the present invention. In this example, a user of tablet computer 302 is performing a performing a repetitive task in user interface 304, where the user is performing an inspection on server equipment at a client site and inputting text into a maintenance checklist for every piece of equipment at the client site. Smart watch 306 is worn by the user and paired with tablet computer 302 as the user inputs text into the maintenance checklist. Due to the limited area of user interface 304, the user is required to scroll through the maintenance checklist to locate a specific server equipment being inspected and input text into a specific portion of the maintenance checklist. For a specific server equipment, the user typically inputs text sequentially into the maintenance checklist at first field 308A, second field 310A, third field 312A, and fourth field 314A. However, in the illustrated example, the user sequentially inputs first text 308B into first field 308A, second text 310B into second field 310A, and third text 312B into fourth field 314A, but fails to input text at third field 312A. Due to the repetitive nature of the maintenance checklist, the user may have overlooked third field 312A and forgot to input text into that portion of the maintenance checklist. As the user continues to scroll through user interface 304 to the next server equipment in the inspection process, the user might not be aware of the missing input at third field 312A. The user would have to later return to re-inspect the specific server equipment to input the text at third field 312A to ensure a proper inspection is performed.

Contextual feedback program 108 provides user engagement based contextual feedback for tablet computer 302 to ensure a level of attention of the user is equal to or greater than a required level of attention for the content (i.e., maintenance checklist) in user interface 304 of tablet computer 302. Contextual feedback program 108 determines a required level of attention for the user interacting with the maintenance checklist displayed in user interface 304 of tablet computer 302 and determines a level of attention for the user interacting with table computer 302. Contextual feedback program 108 determines whether the required level of attention is greater than the level of attention of the user. In this example, since the user overlooked inputting text into third field 312A, contextual feedback program 108 determines the required level of attention of the user is greater than the level of attention for the user. Contextual feedback program 108 identifies available corrective actions based on tablet computer 302 and smart watch 306. Contextual feedback program 108 identifies current user and tablet computer 302 interactions and determines the user is currently inputting third text 312B into fourth field 314A in user interface 304. Contextual feedback program 108 selects multiple corrective actions from the available actions and preforms the selected multiple corrective actions on tablet computer 302 and smart watch 306.

In this example, contextual feedback program 108 utilizes a microfluidic layer of a display on tablet computer 302 to create ripple effect 316 at fourth field 314A, where the user is currently interacting with user interface 304 of tablet computer 302. Ripple effect 316 indicates to the user a field for inputting text was overlooked and the user can review the maintenance checklist to identify the missed field (i.e., third field 312A). Contextual feedback program 108 also utilizes a haptic module on smart watch 306 to vibrate a haptic motor for set duration of five seconds to draw attention to an oversight occurring while performing the maintenance checklist. Contextual feedback program 108 also utilizes a holographic projector to display holographic arrow 320 indicating a direction in user interface 304 where the user can review the maintenance checklist to identify the missed field (i.e., third field 312A) with the missing inputted text.

Figure 4:
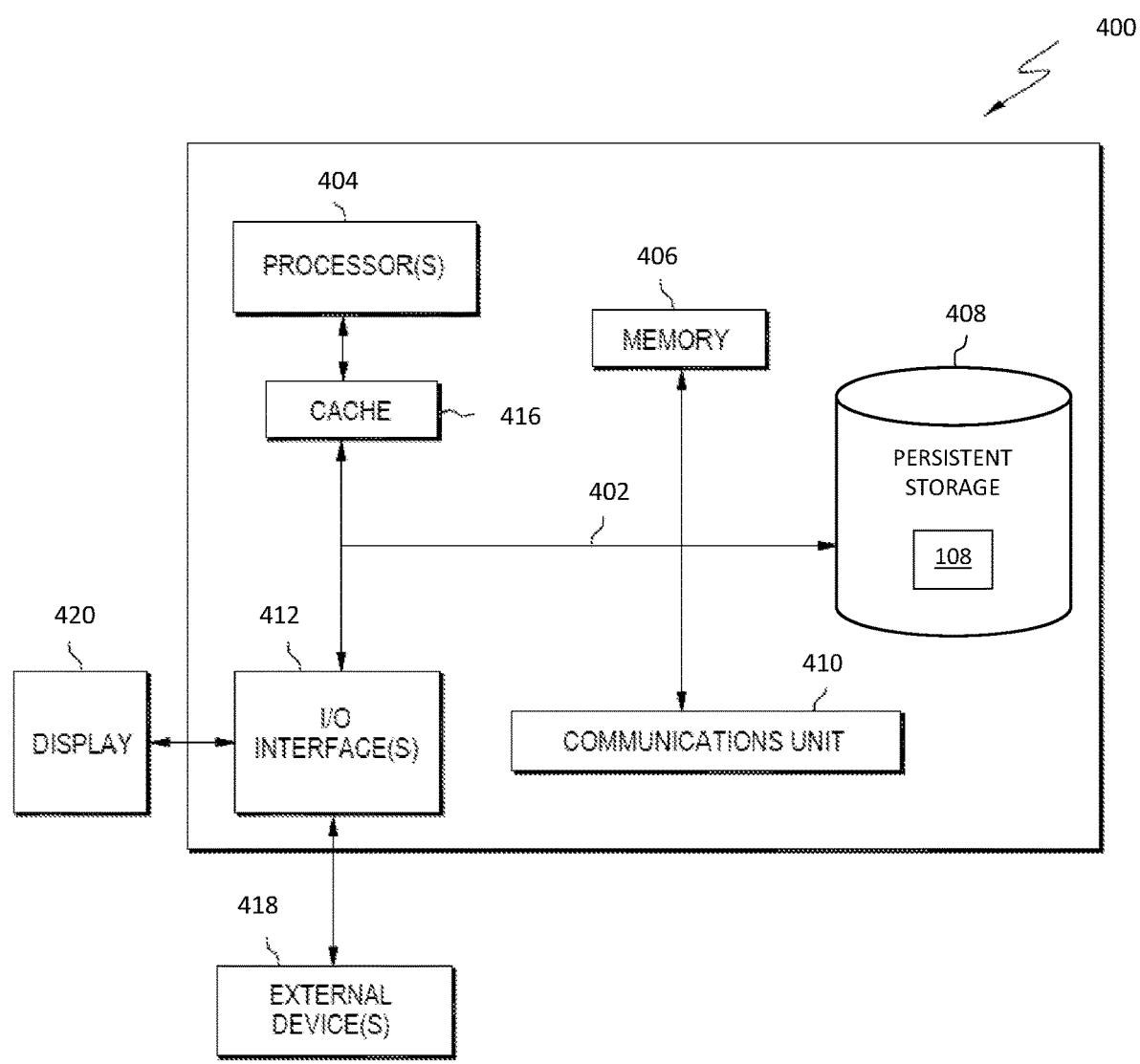
FIG. 4 is a block diagram of components of a computer system, such as the server computer of FIG. 1, in accordance with an embodiment of the present invention.

FIG. 4 depicts computer system 400, where server computer 102 is an example of a computer system 400 that includes contextual feedback program 108. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
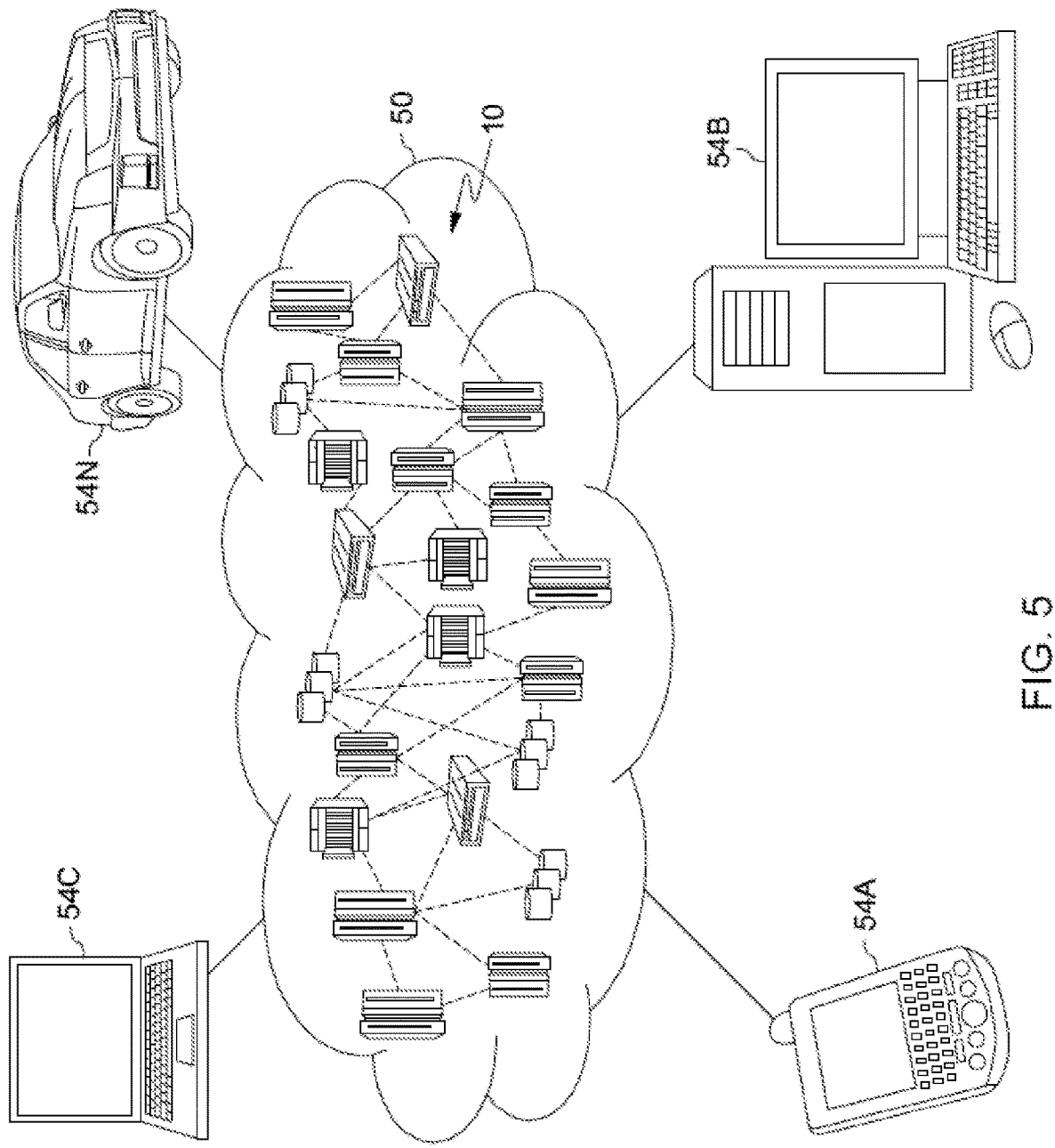
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
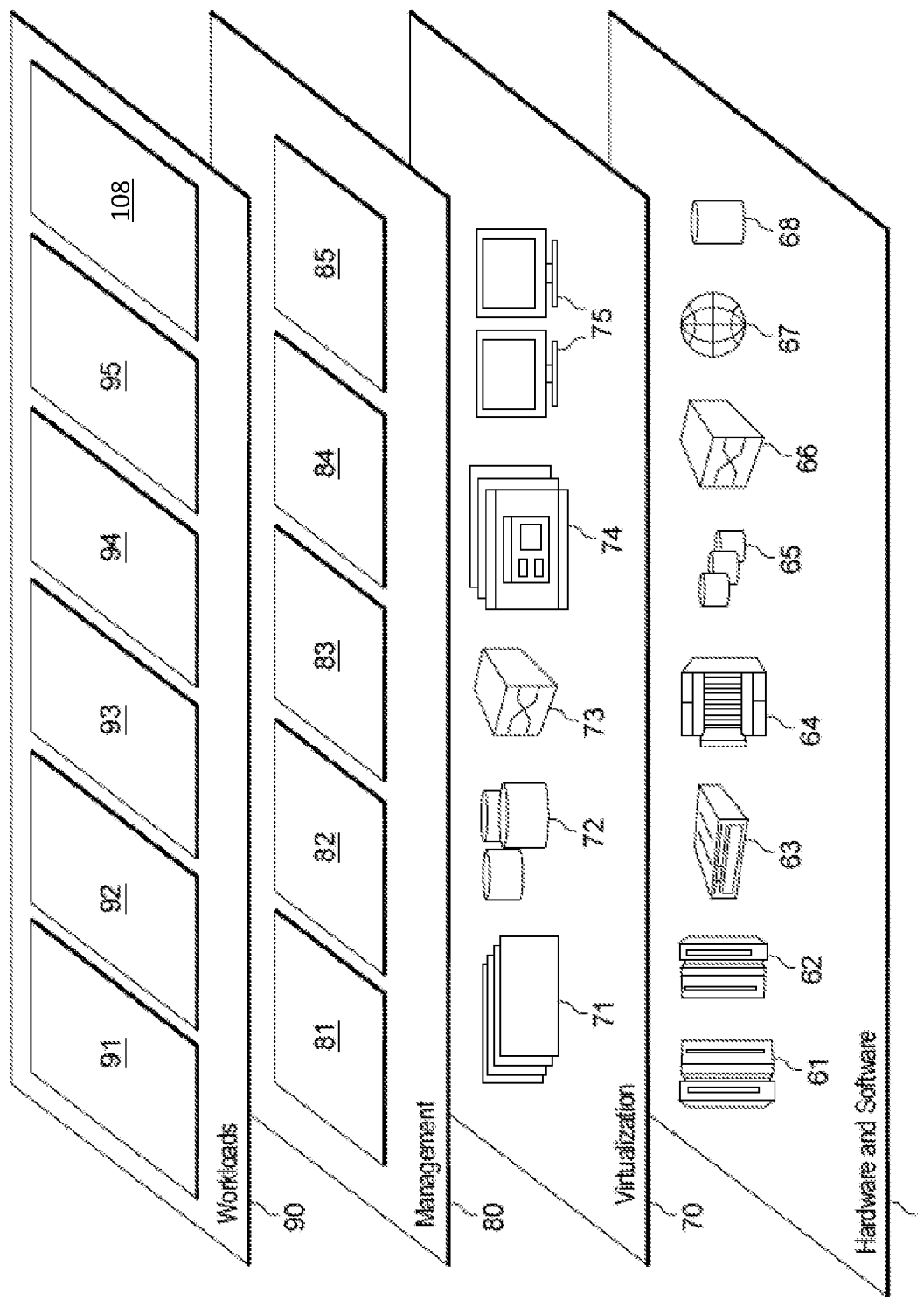
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual feedback program 108.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   determining a required level of attention for a user interacting with content in a user interface of an electronic device;
   determining a level of attention for the user interacting with the content in the user interface of the electronic device;
   responsive to determining the required level of attention is greater than the level of attention for the user, identifying available corrective actions performable by one or more electronic components on the electronic device;
   responsive to identifying one or more user and electronic device interactions, selecting one or more corrective actions from the available actions based on the one or more user and electronic device interactions; and
   performing, via the one or more electronic components, the selected one or more corrective actions on the electronic device, wherein a first corrective action from the selected one or more corrective actions includes a deformation from a microfluidic layered display on the electronic device around an object of the content in the user interface of the electronic device requiring attention by the user.

2. The computer-implemented method of claim 1, wherein determining the required level of attention for the user further comprises:
   determining a content type for the content, wherein the content type is selected from a group consisting of: educational, professional, and leisurely;
   determining a number of content defined tasks with which the user is to interact with;
   determining a level of importance for the content defined tasks based on one or more types of engagement from the user; and assigning a score for the required level of attention based on the content type, the number of content defined tasks, and the level of importance for the content defined task.

3. The computer-implemented method of claim 2, wherein the one or more types of engagement are selected from a group consisting of: selecting an object in the user interface via a touch screen display, inputting text into one or more selected fields in the user interface, reading the content, viewing the content, and listening to the content.

4. The computer-implemented method of claim 1, wherein the level of attention for the user is based on a plurality of parameters selected from a group consisting of: biometric data for the user, one or more gestures performed when the biometric data was captured, and an interaction level for the user with respect to the content in the user interface of the electronic device.

5. The computer-implemented method of claim 1, wherein selecting the one or more corrective actions from the available actions further comprises:
determining an appropriate level of sensation for the selected one or more corrective action based on a deviation between the required level of attention and the level of attention for the user.

6. The computer-implemented method of claim 5, wherein performing the selected one or more correctives actions on the electronic device further comprises:
instructing the one or more electronic components to perform each of the selected one or more corrective actions at the appropriate level of sensation.

7. The computer-implemented method of claim 6, wherein the available corrective actions are selected from a group consisting of: a vibration from a haptic module on the electronic device, the deformation from the microfluidic layered display on the electronic device, and a projection from a holographic projector on the electronic device.

8. A computer program product comprising one or more computer readable storage media and program instructions collectively stored on the one or more computer readable storage media, the stored program instructions executable by one or more computer processors, the stored program instructions comprising:
program instructions to determine a required level of attention for a user interacting with content in a user interface of an electronic device;
program instructions to determine a level of attention for the user interacting with the content in the user interface of the electronic device;
program instructions to, responsive to determining the required level of attention is greater than the level of attention for the user, identify available corrective actions performable by one or more electronic components on the electronic device;
program instructions to, responsive to identifying one or more user and electronic device interactions, select one or more corrective actions from the available actions based on the one or more user and electronic device interactions; and
program instructions to perform, via the one or more electronic components, the selected one or more corrective actions on the electronic device, wherein a first corrective action from the selected one or more corrective actions includes a deformation from a microfluidic layered display on the electronic device around an object of the content in the user interface of the electronic device requiring attention by the user.

9. The computer program product of claim 8, wherein determining the required level of attention for the user, the stored program instructions further comprises:
program instructions to determine a content type for the content, wherein the content type is selected from a group consisting of: educational, professional, and leisurely;
program instructions to determine a number of content defined tasks with which the user is to interact with;
program instructions to determine a level of importance for the content defined tasks based on one or more types of engagement from the user; and
program instructions to assign a score for the required level of attention based on the content type, the number of content defined tasks, and the level of importance for the content defined task.

10. The computer program product of claim 9, wherein the one or more types of engagement are selected from a group consisting of: selecting an object in the user interface via a touch screen display, inputting text into one or more selected fields in the user interface, reading the content, viewing the content, and listening to the content.

11. The computer program product of claim 8, wherein the level of attention for the user is based on a plurality of parameters selected from a group consisting of: biometric data for the user, one or more gestures performed when the biometric data was captured, and an interaction level for the user with respect to the content in the user interface of the electronic device.

12. The computer program product of claim 8, wherein selecting the one or more corrective actions from the available actions, the stored program instructions further comprises:
program instructions to determine an appropriate level of sensation for the selected one or more corrective action based on a deviation between the required level of attention and the level of attention for the user.

13. The computer program product of claim 12, wherein performing the selected one or more correctives actions on the electronic device, the stored program instructions further comprises:
program instructions to instruct the one or more electronic components to perform each of the selected one or more corrective actions at the appropriate level of sensation.

14. The computer program product of claim 13, wherein the available corrective actions are selected from a group consisting of: a vibration from a haptic module on the electronic device, the deformation from the microfluidic layered display on the electronic device, and a projection from a holographic projector on the electronic device.

15. A computer system comprising:
one or more computer processors;
one or more computer readable storage media; and
program instructions stored on the computer readable storage media for execution by at least one of the one or more computer processors, the program instructions comprising:
program instructions to determine a required level of attention for a user interacting with content in a user interface of an electronic device;
program instructions to determine a level of attention for the user interacting with the content in the user interface of the electronic device;
program instructions to, responsive to determining the required level of attention is greater than the level of attention for the user, identify available corrective actions performable by one or more electronic components on the electronic device;

program instructions to, responsive to identifying one or more user and electronic device interactions, select one or more corrective actions from the available actions based on the one or more user and electronic device interactions; and program instructions to perform, via the one or more electronic components, the selected one or more corrective actions on the electronic device, wherein a first corrective action from the selected one or more corrective actions includes a deformation from a microfluidic layered display on the electronic device around an object of the content in the user interface of the electronic device requiring attention by the user.

16. The computer system of claim 15, wherein determining the required level of attention for the user, the stored program instructions further comprises:

program instructions to determine a content type for the content, wherein the content type is selected from a group consisting of: educational, professional, and leisurely;

program instructions to determine a number of content defined tasks with which the user is to interact with;

program instructions to determine a level of importance for the content defined tasks based on one or more types of engagement from the user; and program instructions to assign a score for the required level of attention based on the content type, the number of content defined tasks, and the level of importance for the content defined task.

17. The computer system of claim 16, wherein the one or more types of engagement are selected from a group consisting of: selecting an object in the user interface via a touch screen display, inputting text into one or more selected fields in the user interface, reading the content, viewing the content, and listening to the content.

18. The computer system of claim 15, wherein the level of attention for the user is based on a plurality of parameters selected from a group consisting of: biometric data for the user, one or more gestures performed when the biometric data was captured, and an interaction level for the user with respect to the content in the user interface of the electronic device.

19. The computer system of claim 15, wherein selecting the one or more corrective actions from the available actions, the stored program instructions further comprises:

program instructions to determine an appropriate level of sensation for the selected one or more corrective action based on a deviation between the required level of attention and the level of attention for the user.

20. The computer system of claim 19, wherein performing the selected one or more correctives actions on the electronic device, the stored program instructions further comprises:

program instructions to instruct the one or more electronic components to perform each of the selected one or more corrective actions at the appropriate level of sensation.

* * * * *